United States Patent
Barker

(10) Patent No.: US 7,285,752 B2
(45) Date of Patent: Oct. 23, 2007

(54) HEATED MERCHANDISER FOR BREAD AND THE LIKE

(76) Inventor: Rick A. Barker, 159 Louise St., Rockford, MI (US) 49341

( * ) Notice: Subject to any disclaimer, the term of this patent is extended or adjusted under 35 U.S.C. 154(b) by 173 days.

(21) Appl. No.: 10/984,734

(22) Filed: Nov. 9, 2004

(65) Prior Publication Data
US 2005/0092193 A1    May 5, 2005

Related U.S. Application Data

(63) Continuation-in-part of application No. 10/698,922, filed on Oct. 31, 2003, now abandoned.

(51) Int. Cl.
*A47J 36/24* (2006.01)

(52) U.S. Cl. .................. 219/386; 219/214; 219/218; 219/385; 219/407; 99/483; 222/146.5

(58) Field of Classification Search .............. None
See application file for complete search history.

(56) References Cited

U.S. PATENT DOCUMENTS

| | | |
|---|---|---|
| 1,375,502 A | 4/1921 | Giddings |
| 1,458,127 A | 6/1923 | Brown |
| 1,754,518 A | 4/1930 | Kinnie |
| 2,277,282 A | 3/1942 | Walborn |
| 2,458,190 A | 1/1949 | Newburger |
| 2,527,101 A | 10/1950 | Maddox |
| D176,519 S | 1/1956 | Johnson |
| D209,257 S | 11/1967 | Bressickello |
| 3,545,832 A | 12/1970 | Levenback |
| 3,640,207 A | 2/1972 | Snyder |
| 3,999,475 A * | 12/1976 | Roderick .................. 99/474 |
| 4,074,108 A | 2/1978 | King |
| 4,138,504 A | 2/1979 | Mack et al. |
| 4,215,267 A * | 7/1980 | Kaebitzsch ............... 219/439 |
| 4,343,985 A | 8/1982 | Wilson et al. |
| 4,579,051 A | 4/1986 | Berrens |
| 4,803,921 A | 2/1989 | Nuss |
| 4,827,107 A * | 5/1989 | Peery ...................... 219/521 |
| 4,953,879 A | 9/1990 | Cain et al. |
| 5,123,178 A | 6/1992 | Stein |
| D329,778 S | 9/1992 | Easterling et al. |
| 5,276,309 A * | 1/1994 | Hasse et al. ............. 219/400 |
| 5,380,986 A * | 1/1995 | Mullen ..................... 219/438 |
| D364,530 S | 11/1995 | Robards, Jr. et al. |
| 5,505,009 A | 4/1996 | Stein et al. |
| 5,539,185 A * | 7/1996 | Polster .................... 219/439 |
| 6,005,227 A * | 12/1999 | Pappas ..................... 219/400 |

(Continued)

*Primary Examiner*—Joseph Pelham
(74) *Attorney, Agent, or Firm*—Price, Heneveld, Cooper, DeWitt & Litton, LLP

(57) ABSTRACT

A merchandiser for elongate loaves of bread includes at least one rack having a rear wall, a front wall spaced apart from the rear wall, a pair of sidewalls disposed between the rear wall and the front wall along opposite sides thereof, and a bottom wall disposed between the rear wall, the sidewalls and the front wall along lower portions thereof. The walls support the bread loaves in a generally vertical, freestanding, side-by-side relationship. At least one heater is disposed along at least one of the rear wall or the front wall of the rack with the heater selectively heating the air disposed therein, such that air heated in the interior of the rack heats the vertically stacked bread loaves.

14 Claims, 5 Drawing Sheets

U.S. PATENT DOCUMENTS

| | | |
|---|---|---|
| 6,098,529 A | 8/2000 | Brummett et al. |
| 6,188,046 B1 * | 2/2001 | Barrow .................. 219/433 |
| 6,263,591 B1 * | 7/2001 | La Porte ................ 219/400 |
| 6,455,816 B1 | 9/2002 | Reddy et al. |
| 6,515,262 B1 * | 2/2003 | Li ........................ 219/429 |
| 6,686,563 B1 * | 2/2004 | Pearlman et al. ......... 219/385 |
| 7,005,615 B2 * | 2/2006 | Thomas ................. 219/429 |
| 2002/0005686 A1 | 1/2002 | Nuttall et al. |
| 2002/0072323 A1 | 6/2002 | Hakemann |
| 2003/0024921 A1 | 2/2003 | Reddy et al. |

* cited by examiner

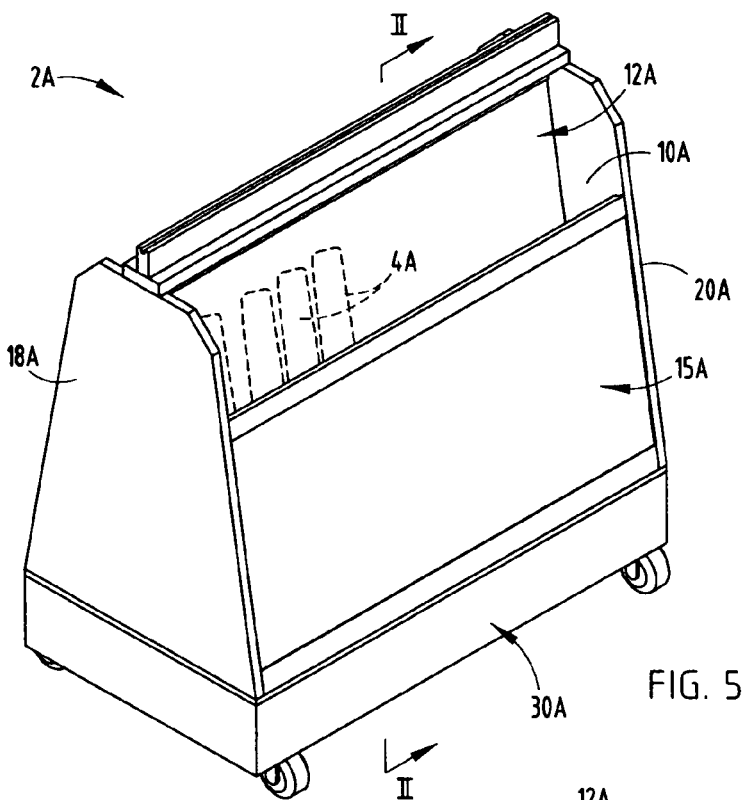
FIG. 5
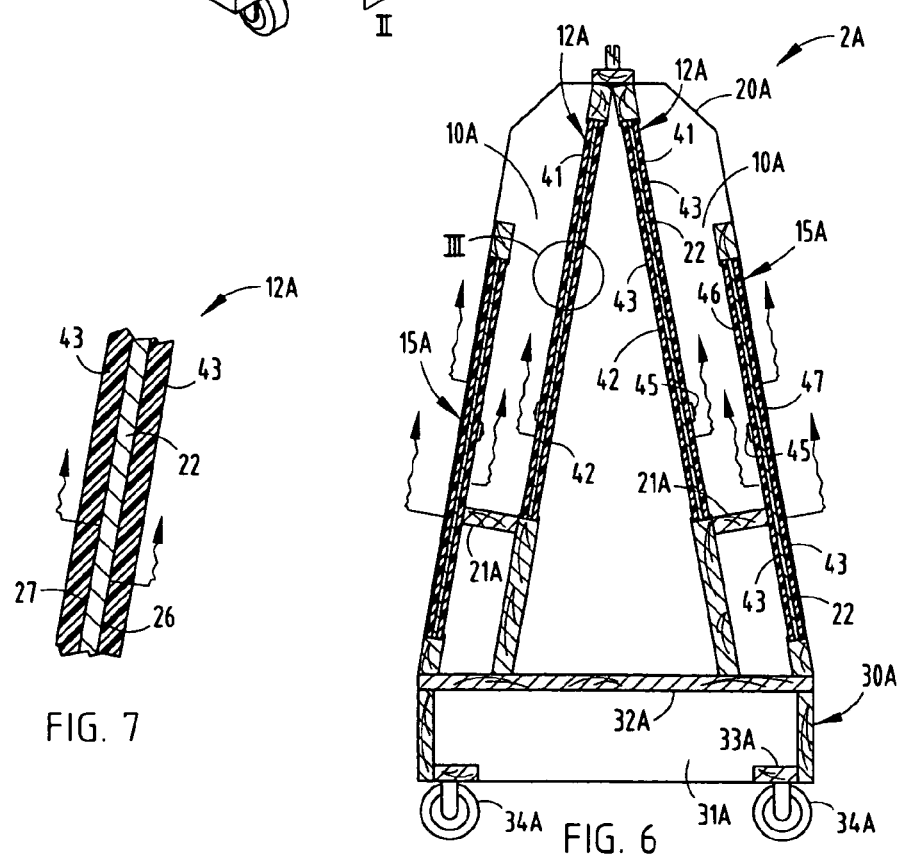
FIG. 7
FIG. 6

HEATED MERCHANDISER FOR BREAD AND THE LIKE

CROSS-REFERENCE TO RELATED APPLICATION

The present application is a continuation-in-part of U.S. application Ser. No. 10/698,922, filed on Oct. 31, 2003 now abandoned, entitled HEATED MERCHANDISER FOR BREAD AND THE LIKE, which is hereby incorporated herein by reference in its entirety and claims priority thereto under 35 U.S.C. §120.

BACKGROUND OF THE INVENTION

The present invention relates to merchandisers and more particularly to bread merchandisers for elongate loaves of fresh baked bread and the like.

Bread racks or bread displays, as they are sometimes called, are used within retail establishments such as grocery stores, supermarkets and the like. These racks are used to store and display ordinary or commercially available bread, that is, bread that is made off-site, baked days or even weeks before by various suppliers and is generally mass produced. These breads are typically displayed within the grocery store on simple metal racks which support the loaves of bread in a generally horizontal orientation.

Modern grocers are keenly aware of profit margins and are constantly looking for new food articles, as well as improved merchandising techniques, in order to increase profits. Specialty goods, that is to say goods that are either hard to find or made on site, have become quite popular in this respect, and many grocers are establishing an in-store deli and/or bakery section in an effort to provide its customers with these specialty items and freshly baked goods.

One such specialty good which has seen an increase in sales is freshly baked bread. Additionally, since the bakery area is an ideal location for the baking and sale of these breads, grocers are increasingly turning over oven time to create these specialty loaves of bread. Typically, these loaves of bread are baked in small batches, utilize no preservatives, and are sold within hours of the baking process.

In addition to new food articles, the modern grocer is also looking to develop new ways of merchandising these articles in an effort to increase sales. However, the methods heretofore have been confined to shelving units and baskets. These racks or baskets are usually located in the bakery section in an attempt to entice the customer into purchasing the bread, as the bakery section automatically suggests that the product is freshly baked. However, the floor space within the grocery store is always at a premium. This is especially true with regard to the bakery section, as this section is typically confined to a relatively small area in comparison to the wide variety of baked products which it offers. However, when the freshly baked bread is removed from the bakery environment and moved into other areas of the store, sales of the bread typically diminish. This is normally attributed to the removal of the bread from the bakery section because the customer loses the suggestion or impression that the bread is freshly baked.

Thus, a system having the aforementioned advantages and solving the aforementioned problems is desired.

SUMMARY OF THE INVENTION

One aspect of the present invention is to provide a merchandiser for elongate loaves of fresh baked bread and the like which includes at least one rack having a generally vertically extending rear wall, a generally vertically extending front wall spaced apart a predetermined distance from the rear wall, a pair of generally vertically extending sidewalls disposed between the rear wall and the front wall along opposite sides thereof, and a generally horizontally extending bottom wall disposed between the rear wall, the sidewalls and the front wall along lower portions thereof. The bottom wall is configured to abuttingly support thereon ends of elongate bread loaves, such that a plurality of the bread loaves are removably retained between the rear wall, the front wall and the sidewalls in a generally vertical, free-standing, side-by-side relationship. A heater is mounted in the merchandiser, and selectively heats the air disposed within the rack and the vertically stacked bread loaves retained therein to maintain the fresh baked smell and feel of the bread loaves.

Another aspect of the present invention is to provide a method of merchandising elongate loaves of bread and the like which includes providing a merchandiser having at least one rack with a generally vertical rear wall, a generally vertical front wall, a pair of generally vertical sidewalls, a bottom wall, and a base to support said rack, wherein at least one heater is disposed along at least one of the rear wall and the front wall. Also provided is a plurality of elongate fresh baked loaves of bread. The loaves of bread are stacked vertically in the rack and the merchandiser is positioned in a location which is visible to a customer. The heater is actuated to maintain the temperature of the loaves of bread in the merchandiser at a temperature not to exceed 120° F., thereby retaining the fresh baked smell and feel of the bread loaves.

These and other advantages of the invention will be further understood and appreciated by those skilled in the art by reference to the following written specification, claims and appended drawings.

BRIEF DESCRIPTION OF THE DRAWINGS

FIG. 5 is a perspective view of yet another embodiment of a merchandiser in accordance with the present invention;

FIG. 6 is a cross-sectional view of the merchandiser of FIG. 5, taken along line II-II;

FIG. 7 is an enlarged view of section III of FIG. 6, illustrating an embodiment of a heated wall section used in the merchandiser;

DETAILED DESCRIPTION OF THE PREFERRED EMBODIMENTS

Figure 1:
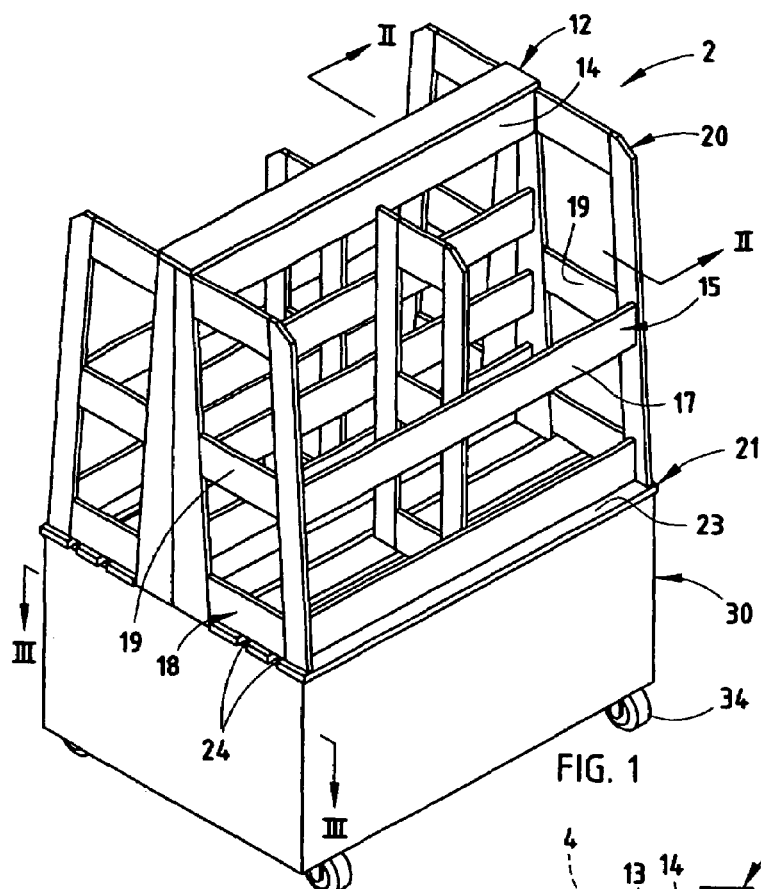
FIG. 1 is a perspective view of a merchandiser embodying the present invention.

For the purposes of the description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is to be understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 2 (FIG. 1) generally designates a heated merchandiser embodying the present invention for the display of elongate or baguette-shaped loaves of bread. In the illustrated example, a double sided merchandiser 2 for elongate loaves of freshly baked breads and the like is illustrated. Merchandiser 2 includes an open rack 10 having a generally vertically extending rear wall 12 and a generally vertically extending front wall 15 which is spaced apart a predetermined distance from rear wall 12. Open rack 10 includes first and second sidewalls 18 and 20, respectively, along opposite sides and a generally horizontally extending bottom wall 21. Bottom wall 21 is positioned horizontally between rear wall 12, sidewalls 18 and 20, and front wall 15 along lower portions thereof. Bottom wall 21 further includes at least one opening which permits the vertical flow of air therethrough. Additionally, bottom wall 21 is configured to support the elongate loaves of bread in such a way that a plurality of the bread loaves are removably retained between rear wall 12, front wall 15 and both sidewalls in a generally vertical, freestanding, side-by-side relationship (see FIG. 4). Merchandiser 2 also includes a base 30 which has an upper portion 32 which supports open rack 10 and a lower portion 33 shaped to support base 30 and associated open rack 10 on a floor surface. Base 30 further includes a heater 40 disposed in the generally enclosed interior thereof which selectively heats the air enclosed therein, such that the heated air flows upwardly, through the opening in bottom wall 21 of open rack 10, through open rack 10 and along opposite sides of the vertically stacked bread loaves to maintain the fresh baked smell and feel of the bread loaves.

Figure 4:
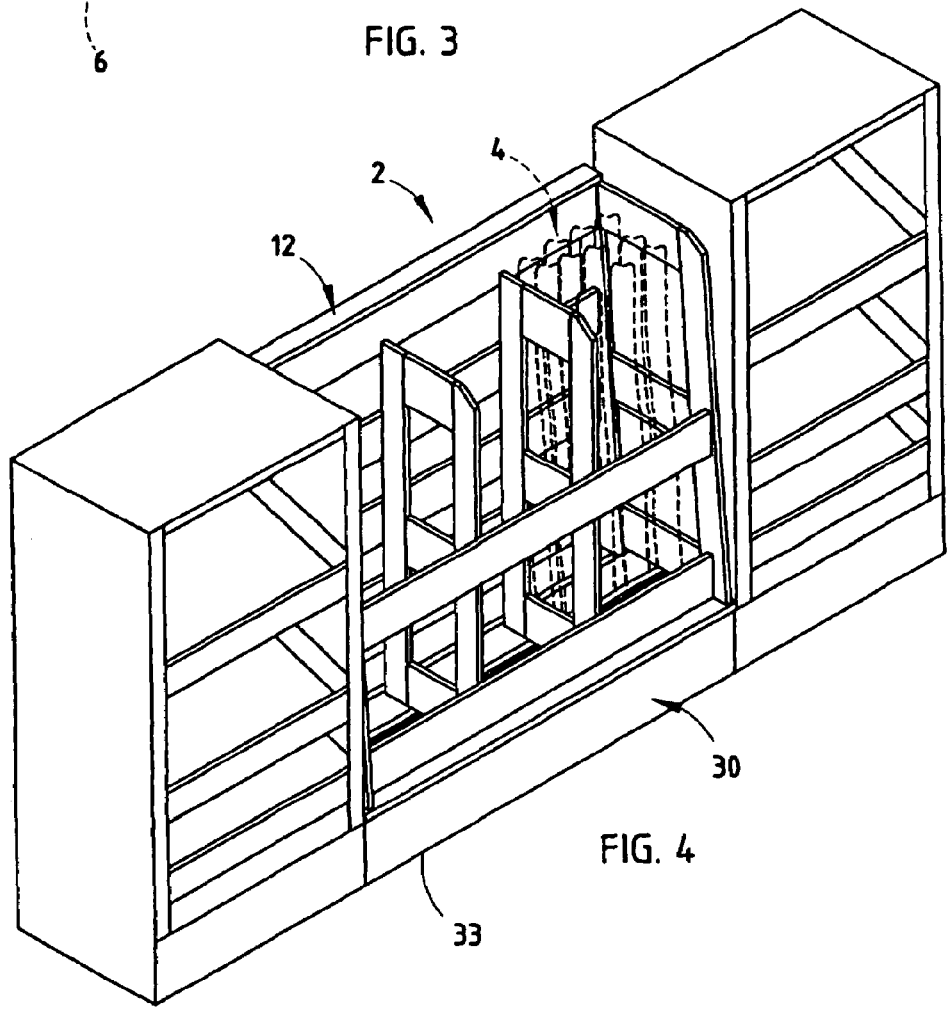
FIG. 4 is another embodiment of a merchandiser in accordance with the present invention.

In the illustrated example, the bread used with the merchandiser is freshly baked elongate or baguette-shaped loaves of bread and is generally well known in the art. This shape of bread is common with French or Italian bread, however, any bread with an elongate shape may be used as long as it is capable of being stored vertically. Typically, this will require a bread with a sufficiently hard crust to allow for vertically oriented storage. Further, these bread loaves are typically baked in relatively small batches, utilize little to no preservatives, and are meant to be sold within hours of the baking process, hence the term freshly baked. The packaging for this bread is frequently a paper bag. This packaging allows some of the moisture in the fresh baked bread to escape, thereby insuring that the crust remains hard or crisp while simultaneously providing a barrier against outside contaminants. Other forms of packaging may be used though, as requirements dictate. As recognized by those skilled in the art, the elongate and baguette-shaped freshly baked loaves of bread illustrated in FIG. 4 are different from commercially available, mass produced soft breads, which are usually wrapped in plastic bags and stored horizontally.

Figure 2:
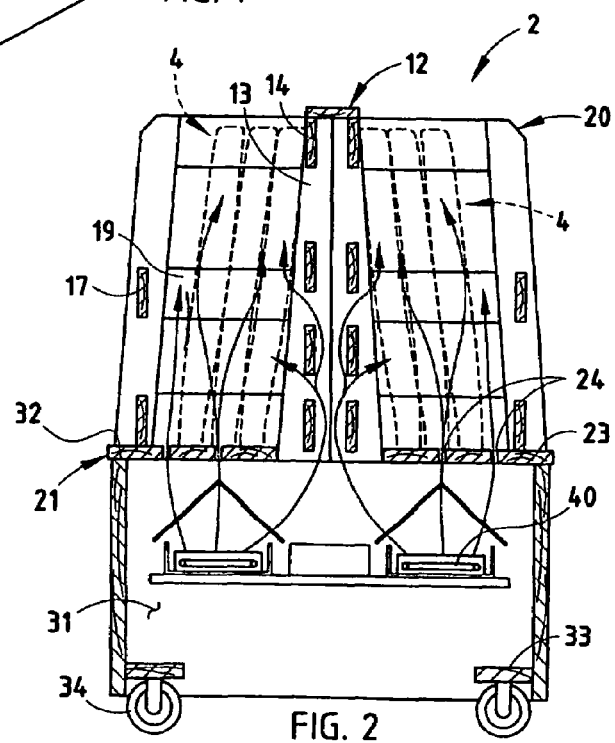
FIG. 2 is a sectional view of the merchandiser of FIG. 1, taken along line II-II.

More particularly, vertically extending rear wall 12 of open rack 10 defines a plurality of openings 13 as best viewed in FIG. 2. Characteristically, these openings become wider, with respect to the vertical spacing, as openings 13 progress vertically upward. A plurality of slats 14 define the plurality of openings 13 and in one embodiment are made of wood. However, this is only one embodiment and other configurations and materials may be used to create slats 14 or openings 13.

Vertically extending front wall 15 is spaced apart a predetermined distance from rear wall 12. Front wall 15 is generally constructed from at least one horizontally extending slat 17 vertically positioned at a height that is substantially less than the height of rear wall 12. This positioning allows easy withdrawal of the bread loaves from open rack 10. In one embodiment, horizontally extending slat 17 is made of wood and is spaced at approximately the midpoint of front wall 15. However, this example is not meant to be limiting and a plurality of slats 17 may be used vertically, horizontally or in any other configuration as requirements dictate and further, may be disposed at any height. Moreover, slat 17 may be fabricated from other materials in addition to wood. In one embodiment, two slats are used to create front wall 15, one at the bottom of front wall 15 and the other at approximately its midpoint.

First sidewall 18 and second sidewall 20 are disposed vertically between rear wall 12 and front wall 15 on opposite ends thereof. Sidewalls 18 and 20 are generally constructed from at least one horizontally extending slat which is vertically positioned at a preferred height. In one embodiment, three horizontally extending slats 19 are made of wood and spaced vertically equidistant, with one slat 19 disposed at approximately the midpoint of walls 18 and 20. However, as described above, this example is not meant to be limiting and any number of slats 19 may be used vertically, horizontally or in any other configuration as the requirements dictate. Further, slats 19 may be disposed at any height and fabricated from other materials.

The rear wall 12, front wall 15, sidewalls 18 and 20 and bottom wall 21 work in conjunction to create an enclosure which is relatively open in character and defines open rack 10. Bottom wall 21 includes at least one opening which permits the vertical flow of air therethrough (as described below) and is configured to support the ends of the elongate loaves of bread which are removably retained within open rack 10. In one embodiment, bottom wall 21 is fabricated from a plurality of laterally spaced apart, horizontally extending slats 23 wherein the opening comprises a plurality of elongate slots 24 defined between slats 23. Although any material may be used to manufacture slats 23, in the preferred embodiment, wooden slats are used. Additionally, the spacing of slats 23 may vary depending upon specific requirements.

Merchandiser 2 includes base 30 which supports bottom wall 21, thereby supporting open rack 10. Base 30 has a generally enclosed interior 31 and includes an upper portion 32 and a bottom portion 33. In one embodiment, upper portion 32 is generally open and base 30 is box-shaped and made of wood. Again however, other materials and shapes may be used as the specific requirements dictate. Additionally, bottom 33 is generally configured to support base 30 from a floor surface and may include a plurality of wheels 34 which rollingly support merchandiser 2. Still further, disposed within enclosed interior 31 is heater 40.

Figure 3:
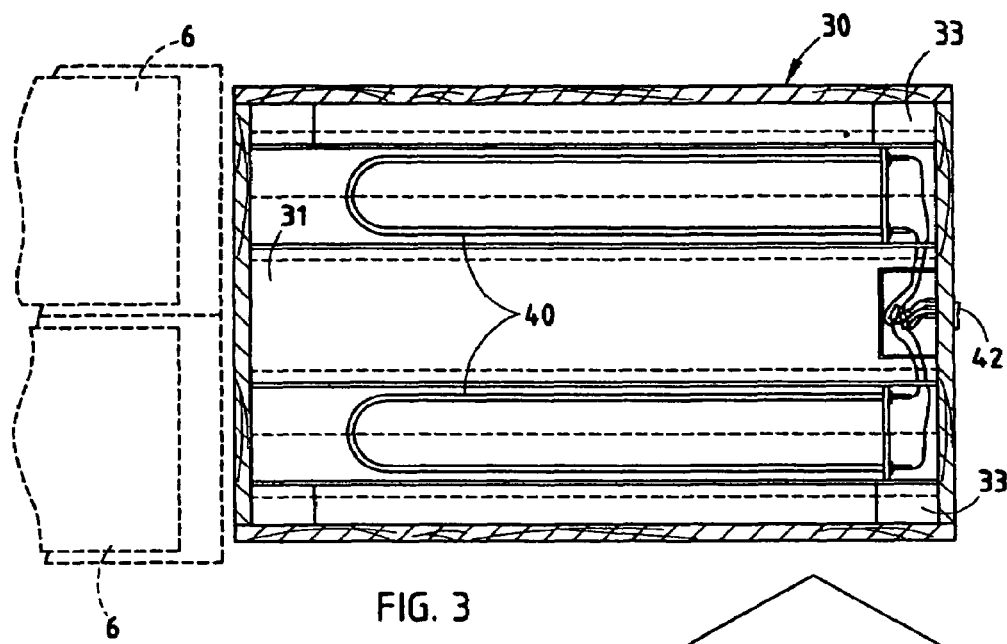
FIG. 3 is a sectional view of the merchandiser of FIG. 1, taken along line III-III and positioned adjacent a checkout counter.

As illustrated in FIG. 3, at least one heater 40 is disposed within enclosed interior 31 of base 30. Heater 40 may be of any type which is capable of slightly warming the air within enclosed interior 31. Heater 40 is used to heat the air within enclosed interior 31, thereby inducing the warm air to rise up and through openings or slots 24. Heater 40 raises the temperature of the air within enclosed interior 31 to such a degree that the air rising, through slots 24 in bottom wall 21 and slots 13 in rear wall 12, is heated to a temperature of between about 80° and 120° F., more preferably between about 85° and 110° F. and most preferably between about 90° and 100° F. Any type of heater that meets these requirements may be used. However, in the preferred embodiment, a pair of U-shaped electrically resistant heaters are utilized. Additionally, although a fan may be used to circulate or promote airflow through the various slots 24, in the preferred embodiment, no fan is used and the heated air is moved through a convective process. Switch 42' is disposed on base 30 in any convenient location and controls the operation of heater 40. Further, it is envisioned that an electronic thermostat may be used to regulate the operation of heater 40 in order to insure that the proper temperature requirements are met.

As illustrated in FIG. 4, a second embodiment is shown which utilizes the same features and characteristics as the first embodiment. However, instead of the merchandiser being rollingly supported, base 30 of merchandiser 2 is configured to be supported directly from lower portion 33 of base 30. For example, merchandiser 2 may be disposed between other shelving units. Further, the merchandiser may be supported off of the floor surface, for example, on a counter or shelf surface.

As best illustrated in FIG. 2, the operation of merchandiser 2 is such that heater 40, when turned on, will heat the air within enclosed area or interior 31 of base 30 and through convection the heated air will rise toward top 32 of base 30 and will escape either through slots 24 or openings 13 of open rack 10. In one embodiment, slots 24 are evenly spaced to insure even heat distribution along the bottom of the loaves of bread supported on slats 23. However, in order to insure a more even heat distribution, slots 13 increase in vertical separation as slats 14 progress vertically upward in order to yield a more even heat distribution along rear wall 12 and correspondingly along the bread loaves. In use then, as the heated air rises through slots 13 and 24, the plurality of elongate loaves of freshly baked bread, while being retained within open rack 10, are warmed to a slightly higher temperature.

As best illustrated by FIGS. 5-8, another embodiment of the heated bread display is illustrated, wherein the reference numeral 2A (FIG. 5) generally designates the heated merchandiser of this alternate embodiment. To reduce redundant discussion, similar components and features are identified with the same identification number as with heated merchandiser 2, but with the addition of the letter "A". In the illustrated example, a double sided merchandiser 2A is illustrated. However, as both sides are generally similar in configuration and use, only one side will be discussed in detail and the other side is to be attributed the same characteristics, and variations thereto, unless otherwise noted.

Figure 8:
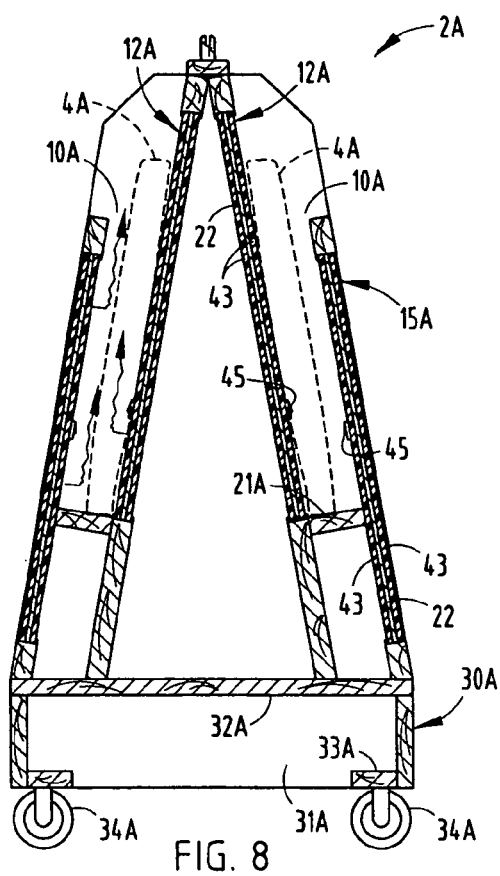
FIG. 8 is a cross-sectional view of the merchandiser of FIG. 6, including loaves of bread disposed therein.

Merchandiser 2A includes at least one rack 10A having a generally vertically extending rear wall 12A and a generally vertically extending front wall 15A which is spaced apart a predetermined distance from rear wall 12A. Rack 10A includes a first sidewall and a second sidewall 18A and 20A, respectively, along opposite sides and a generally horizontally extending bottom wall 21A (See FIG. 6). Bottom wall 21A is positioned generally horizontally between rear wall 12A, sidewalls 18A and 20A, and front wall 15A along lower portions thereof. Bottom wall 21A is configured to support the elongate loaves of bread 4A in such a way that a plurality of the bread loaves are removably retained between rear wall 12A, front wall 15A and both side walls 18A and 20A in a generally vertical, freestanding, side-by-side relationship (FIG. 8). As best illustrated in FIG. 6, merchandiser 2A includes a base 30A which has an upper portion 32A which supports rack 10A, and a lower portion 33A shaped to support base 30A and associated rack 10A on a floor surface. In the preferred embodiment, front wall 15A and rear wall 12A are fabricated to include a heater 22 which heats the air and/or vertically stacked loaves of bread 4A to maintain the fresh baked smell and feel of the bread loaves. As described previously, the bread used with the merchandiser 2A is freshly baked elongate or baguette-shaped loaves of bread and is generally well known in the art. This shape of bread is common with French or Italian bread, however, any bread with an elongate shape may be used as long as it is capable of being stored vertically.

More particularly, vertically extending rear wall 12A of rack 10A defines a heated surface 41. In one preferred embodiment, generally vertically extending rear wall 12A is fabricated by sandwiching a generally flat heater 22 between one or more thermally conductive plate members 43 (FIG. 7). In this configuration, heater 22 is maintained in an upright position and supported by the plate members 43, while plate members 43 allow the heat produced by heater 22 to permeate therethrough, thereby heating the corresponding air and/or bread loaves 4A. Although numerous types and styles of heaters may be used, in the preferred embodiment, heater 22 is a silicone laminate heater available from Chromalox, Inc., having a wattage that is dependant upon the size of wall 12A, and radiates heat from opposite sides 26 and 27 of heater 22. For example, if a 15.5" (inch)×21" (inch) heater is used, a wattage of between about 200-600 watts, more preferably between about 300-500 watts, and most preferably between about 400-500 watts is used. In one preferred embodiment, a 465 watt heater is used. Of course, this is not meant to be limiting in any manner, and numerous other types of heaters and different wattages may be used as the specific requirements dictate. Further, although numerous plate members 43 may be used, in one preferred embodiment, an acrylic sheet, such as PLEXIGLAS™, is utilized to support heater 22 and thermally conducts the heat therefrom. Of course, this is also not meant to be limiting, and numerous materials may be utilized as the requirements dictate.

As described above, wall 12A includes heater 22 which is captured, supported and/or sandwiched between plate members 43. In this configuration, the heat being produced by heater 22 is thermally conducted through both plate members 43, thereby radiating heat from surface 41, toward or into rack 10A, as well as from the opposite surface 42. Thus, heated surface 41 heats rack 10A, thereby heating bread loaves 4A stored therein. Heated surface 42, and to some extent heated surface 41, will then radiate, conduct or otherwise transfer heat to the merchandiser, causing merchandiser 2A itself to be heated to a temperature which is above the ambient temperature. By heating merchandiser 2A, the merchandiser itself will give off heat externally (FIG. 6), thereby enticing the customers to purchase the bread loaves by again giving the customers the impression that the loaves of bread are freshly baked. However, in another embodiment (not shown), one of the plate members 43 corresponding to heated surfaces 41 or 42 may utilize an insulative plate 43, thereby directing heat in only one direction. For example, opposite surface 42 may be fabricated from an insulative material, whereby the majority of the heat will be radiated from surface 41 and into rack 10A.

As described above, at least one heater 22 is disposed within rear wall 12A and/or front wall 15A. Heater 22 may be of any type which is capable of slightly warming the air surrounding walls 12A and/or 15A and is used to heat the air within semi-enclosed rack 10A, thereby warming the elongate loaves of bread 4A through direct contact with the elongate loaves of bread and by warming the air surrounding the bread loaves. The amount of heat which is to be thermally transferred from heater 22 and into rack 10A will vary depending on the specific requirements. However, one preferred temperature range for rack 10A is between about 80° and 120° F., more preferably between about 85° and 110° F., and most preferably about 90° and 100° F. Any type of heater that meets these requirements may be used. However, in the preferred embodiment, an electrically resistant flat heater is utilized. Additionally, although a fan may be used to circulate or promote airflow within rack 10A, in one preferred embodiment, no fan is used, and the heated air is allowed to warm the elongate loaves of bread through direct contact and/or a convective process. As illustrated in FIG. 8, a switch or thermostat 45 may also be disposed on or within merchandiser 2A in any convenient location to control the operation of heaters 22. For example, an electronic thermostat may be used to regulate the operation of at least one of the heaters 22 in order to insure that the proper temperature requirements are met.

Vertically extending front wall 15A is spaced apart a predetermined distance from rear wall 12A. Front wall 15A is generally constructed from the same materials as described with respect to rear wall 12A, while being vertically positioned at a height that is substantially less than the height of rear wall 12A. This positioning allows for the easy withdrawal of the bread loaves from rack 10A. Front wall 15A also includes heating element 22 which is sandwiched, surrounded by or supported by plate members 43 and heats surface 46, thereby heating rack 10A, as well as heating front surface 47 which directs heat toward the customer. Of course, as described previously, one of the surfaces 46 or 47 may utilize a thermally insulative material, thereby heating only a single surface 46 or 47. For example, front surface 47 may utilize a thermally insulative plate member 43, thereby preventing heat from radiating in a forward direction and away from rack 10A.

In the foregoing, a heater 22 has been described which radiates heat from both sides of the heater, wherein plate members 43 may either be thermally conductive or thermally insulative depending on the specific requirements. However, it is also envisioned that heater 22 may itself radiate heat from only one side, thereby conducting heat in a single direction, preferably toward or into rack 10A. Further, although the described embodiment utilizes a heated rear wall 12A and a heated front wall 15A, thereby heating rack 10A from both heated surfaces 41 and 46, it is envisioned that a single heated rear wall 12A or front wall 15A may be utilized, thereby using a single heated surface 41 or 46 to heat rack 10A.

First sidewall 18A and second sidewall 20A are disposed vertically between rear wall 12A and front wall 15A on opposite ends thereof. Sidewalls 18A and 20A are generally constructed from a solid material, thereby semi-enclosing rack 10A, and positioned at a preferred height. In one embodiment a solid piece of wood or similar semi-rigid or rigid material is utilized to at least partially enclose the ends of rack 10A. Again however, this example is not meant to be limiting in any manner and any material may be used, whether solid or not, as the specific requirements dictate. Further, sidewalls 18A and 20A may also be fabricated to incorporate a heating element as described with respect to rear wall 12A and front wall 15A.

The rear wall 12A, front wall 15A, sidewalls 18A and 20A and bottom wall 21A work in conjunction to create or define an enclosure or rack 10A which is relatively closed in character. Bottom wall 21A is disposed at the bottom of rack 10A and will typically be fabricated from a solid material, such as that which is utilized for sidewalls 18A and 20A, thereby permitting the generally elongate loaves of bread to be positioned thereon while being removable therefrom. In one embodiment, bottom wall 21A is fabricated from a generally solid piece of wood. Of course, this is not meant to be limiting, and any material may be used in the manufacture of bottom wall 21A, and further, openings may be disposed therein to allow for air circulation as the specific requirements may dictate.

Merchandiser 2A includes base 30A which supports walls 12A, 15A, 18A and 20A, thereby supporting rack 10A. Base 30A has an interior 31A and includes an upper portion 32A and a bottom portion 33A. In one embodiment, base 30A is box-shaped, generally open and made of wood, while upper portion 32A is generally closed. Again however, other materials and shapes may be used. Additionally, bottom 33A is generally configured to support base 30A from a floor surface and may include a plurality of wheels 34A which rollingly support merchandiser 2A.

As best illustrated in FIG. 6, the operation of merchandiser 2A is such that heater 22, when turned on, will heat the air within semi-enclosed rack 10A, and through convection or direct contact, the heated air and/or plate 43 will heat the elongate loaves of bread disposed within rack 10A. In one preferred embodiment, heater 22 is a generally a flat plate-like heater which evenly distributes the heat to insure a uniform heat distribution along the sides of the loaves of bread 4A supported on wall 21A. In use then, as the heated air is conducted through walls 12A and 15A, the plurality of elongate loaves of freshly baked bread 4A, while being retained within rack 10A, are warmed to a temperature slightly higher than ambient temperature.

When the merchandiser is turned on and the loaves of freshly baked bread are heated, or more appropriately, are able to retain some of the heat absorbed during the baking process, heaters 22 and/or thermostat 45 will regulate the temperature of the air within rack 10A so that the freshly baked bread is kept at a temperature of between about 80° to about 120° F., more preferably between about 85° to 110° F., and most preferably between about 90° to 100° F., in order to maintain the fresh baked smell and feel of the bread loaves.

The filling or refilling of the freshly baked bread is made easier due to the relatively open vertical front wall 15A. This allows the bread to be easily inserted into racks 10A and therefore easily restocked. Simultaneously, front wall 15A allows for the bread to be easily removed by the customer. When the merchandiser is to be restocked, the bread 4A may be brought to the location of the merchandiser, for example, at the checkout lanes. Alternatively, the merchandiser may be moved or, in one preferred embodiment, rolled to a convenient location for restocking. This location may be, for example, the bakery.

Figure 9:
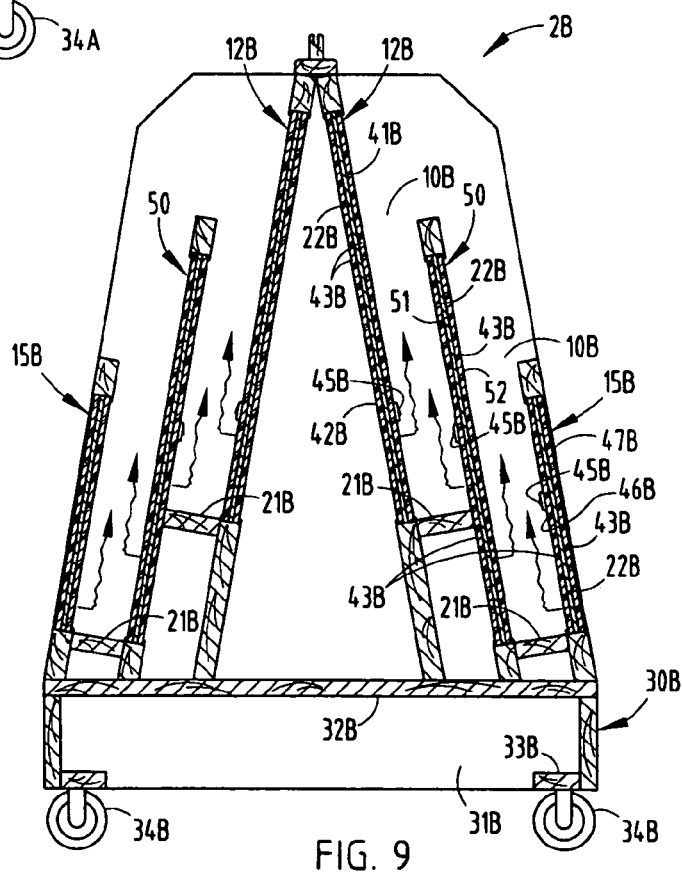
FIG. 9 is a cross-sectional view of yet another embodiment of a merchandiser in accordance with the present invention.

A modified merchandiser 2B is shown in FIG. 9 and includes components and features similar to merchandiser 2A. However, a plurality of racks 10B are utilized. To reduce redundant discussion, similar components and features are identified with the same identification number, but with the addition of the letter "B". In this configuration, the plurality of racks 10B support, display and heat bread loaves 4B, thereby providing a merchandiser 2B having multiple racks for the display of a higher number or quantity of bread loaves 4B. For example, FIG. 9 illustrates a pair of racks 10B which are fabricated by utilizing a rear wall 12B and a front wall 15B, subdivided by a middle or intermediate wall 50. Rear wall 12B, front wall 15B and intermediate wall 50 are similar in configuration to the previously described embodiments of walls 12A and 15A, wherein each wall 12B, 15B and 50 will typically include a heater 22B disposed between a pair of plate members 43B. In the preferred embodiment, intermediate wall 50 will radiate heat from surfaces 51 and 52. Of course, it is envisioned that only a single surface 51 or 52 may be heated and further yet, neither surface 51 nor 52 may need to be heated. Therefore, taking merchandiser 2B as a complete unit, any single surface 41B or 42B of rear wall 12B, 51 or 52 of intermediate wall 50, and 46B or 47B of front wall 15B, may be heated, either alone or in conjunction with one another, and in any combination thereof, in order to achieve the proper heating characteristics as the specific requirements dictate.

Figure 10:
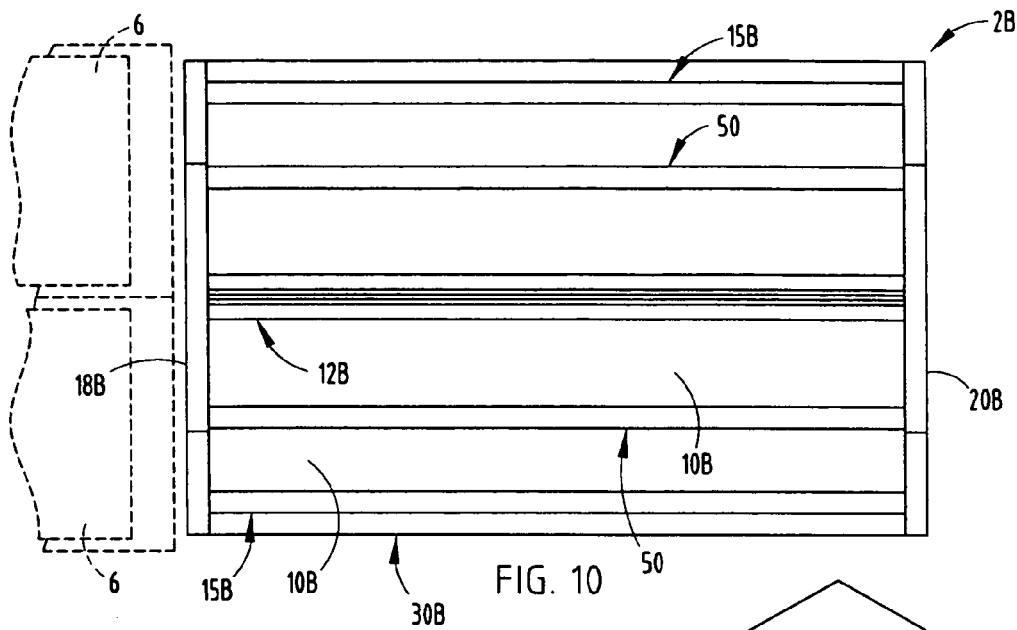
FIG. 10 is a top view of the merchandiser of FIG. 9, positioned adjacent a checkout counter.

An associated method of merchandising elongate loaves of fresh baked bread and the like includes vertically stacking a plurality of loaves of freshly baked bread 4B in racks 10B of merchandiser 2B. The merchandiser 2B can then be positioned in a location which is visible to the customer. In the embodiment illustrated in FIG. 10, the merchandiser 2B is positioned immediately before the checkout lanes 6 of a grocery store or supermarket, as a point of sale display, giving the customer the impression, more particularly the feeling or sensation, that the loaves of bread have been recently removed from the oven, thereby enticing the customers to purchase the fresh, warm bread. In this preferred embodiment, double sided merchandiser 2B is used and is positioned between two checkout lanes 6, thereby serving both lanes with a single unit. The merchandiser is then turned on and the loaves of freshly baked bread are heated by heaters 22B in order to retain some of the heat absorbed during the baking process. Heater 22B, and thermostat 45B (if supplied), will regulate the temperature of the air within racks 10B so that the freshly baked bread 4B is kept at a temperature of between about 80° and about 120° F., more preferably between about 85° and 110° F., and most preferably between about 90° and 100° F., in order to maintain the fresh baked smell and feel of the bread loaves.

Figure 11:
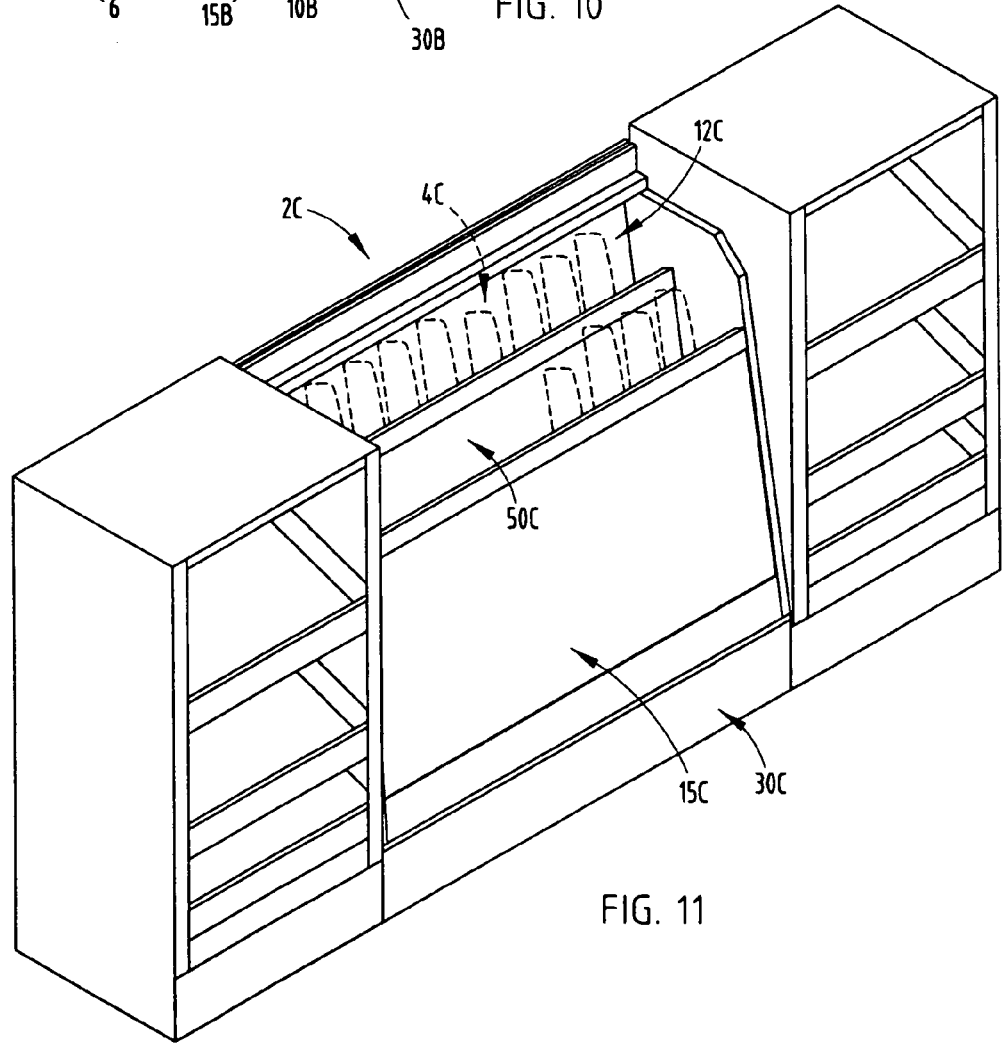
FIG. 11 is a perspective view of yet another embodiment of a merchandiser in accordance with the present invention.

Yet another embodiment of the merchandiser is illustrated in FIG. 11. In this embodiment, merchandiser 2C is positioned between displays or shelving units, and base 30 is configured to support the merchandiser directly from a floor or other vertical surface. Of course, wheels may also be used. Although a single sided merchandiser 2C is illustrated, it is to be understood that a double sided merchandiser may also be used, as well as various other configurations.

By increasing the temperature of the fresh baked bread, the shelf life is accordingly decreased. Therefore, the temperature that the freshly baked bread is kept at is required to be relatively low. Merchandisers 2, 2A, 2B and 2C are designed to maintain the warmth of the freshly baked bread to a temperature only slightly higher than the ambient temperature. For example, the merchandisers 2, 2A, 2B and 2C may maintain the already oven heated fresh bread at a preferred temperature of between about 90° to about 100° F., giving the customer the impression that the bread was very recently removed from a bakery oven. Because of these low temperatures and lack of other mechanical or electrical parts, merchandisers 2, 2A, 2B and 2C are made from a wood material. This provides a softer, more boutique-like look to the merchandiser, rather than the harsh characteristics of stainless steel which is typical of heating and steaming ovens which are in use today. Additionally, the preferred embodiment utilizes no fan. Therefore, a very simple, yet effective, merchandiser has been developed which imparts in a customer a feeling that the displayed bread has been recently baked, thereby enticing the customer to purchase the bread and accordingly, increasing the sales of such bread products.

In the foregoing description, it will be readily appreciated by those skilled in the art that modifications may be made to the invention without departing from the concepts disclosed herein. Such modifications are to be considered as included in the following claims, unless these claims by their language expressly state otherwise.

I claim:

1. A method of merchandising elongate loaves of bread and the like, comprising:
   providing a merchandiser having at least one rack with a generally vertical rear wall, a generally vertical front wall, a pair of generally vertical sidewalls, a bottom wall and at least one heater disposed along at least one of said rear wall and said front wall;
   providing a plurality of elongate fresh baked loaves of bread;
   standing the loaves of bread vertically in the at least one rack;
   positioning said merchandiser in a location visible to a customer; and
   actuating said heater to maintain the temperature of the loaves of bread in the merchandiser at a temperature not to exceed 120° F. to retain the fresh baked smell and feel of the bread loaves.

2. The method of merchandising according to claim 1, wherein:
   said positioning step includes locating the merchandiser adjacent a checkout counter of a retail store.

3. A method of merchandising as set forth in claim 1, wherein:
   said providing step includes providing an electrically resistant heater which heats the air within the rack to a temperature of between about 90-100° F.

4. A method of merchandising as set forth in claim 3, wherein:
   said providing step includes providing the front wall with a height that is substantially less than the height of the rear wall to permit easy withdrawal of the bread loaves from an upper portion of said rack.

5. A method of merchandising as set forth in claim 4, wherein:
   said providing step includes providing at least one of said front wall and said rear wall with a pair of plates disposed opposite one another; and
   said heater is disposed between said pair of plates; and wherein
   at least one of the pair of plates is thermally conductive.

6. A method of merchandising as set forth in claim 5, wherein:
   said actuating step includes actuating the heater automatically with an electronic thermostat.

7. A method of merchandising as set forth in claim 6, wherein:
   said providing step includes providing a base having a lower portion thereof shaped for abutting support on an associated floor surface, and wherein said base has a box-shape and is made of wood.

8. A method of merchandising as set forth in claim 7, wherein said providing step includes providing the base with a plurality of wheels to rollingly support the merchandiser.

9. A method of merchandising as set forth in claim 1, wherein:

said providing step includes providing at least two racks defined by at least one generally vertically extending intermediate wall spaced apart a predetermined distance from said rear wall and said front wall, and providing at least first and second generally horizontally extending bottom walls, said first bottom wall disposed generally horizontally between said rear wall and said intermediate wall and said second bottom wall disposed generally horizontally between said intermediate wall and said front wall, along lower portions thereof, wherein said at least one heater is disposed along at least one of said rear wall, said intermediate wall and said front wall.

10. A method of merchandising as set forth in claim 1, wherein:

said providing step includes providing an electrically resistant heater which heats the air within the rack to a temperature of between about 90-100° F.

11. A method of merchandising as set forth in claim 1, wherein:

said providing step includes providing the front wall with a height that is substantially less than the height of the rear wall to permit easy withdrawal of the bread loaves from an upper portion of said rack.

12. A method of merchandising as set forth in claim 1, wherein:

said providing step includes providing at least one of said front wall and said rear wall with a pair of plates disposed opposite one another; and said heater is disposed between said pair of plates; and wherein at least one of the pair of plates is thermally conductive.

13. A method of merchandising as set forth in claim 1, wherein:

said actuating step includes actuating the heater automatically with an electronic thermostat.

14. A method of merchandising as set forth in claim 1, wherein said providing step includes providing the base with a plurality of wheels to rollingly support the merchandiser.

* * * * *